UNITED STATES PATENT OFFICE.

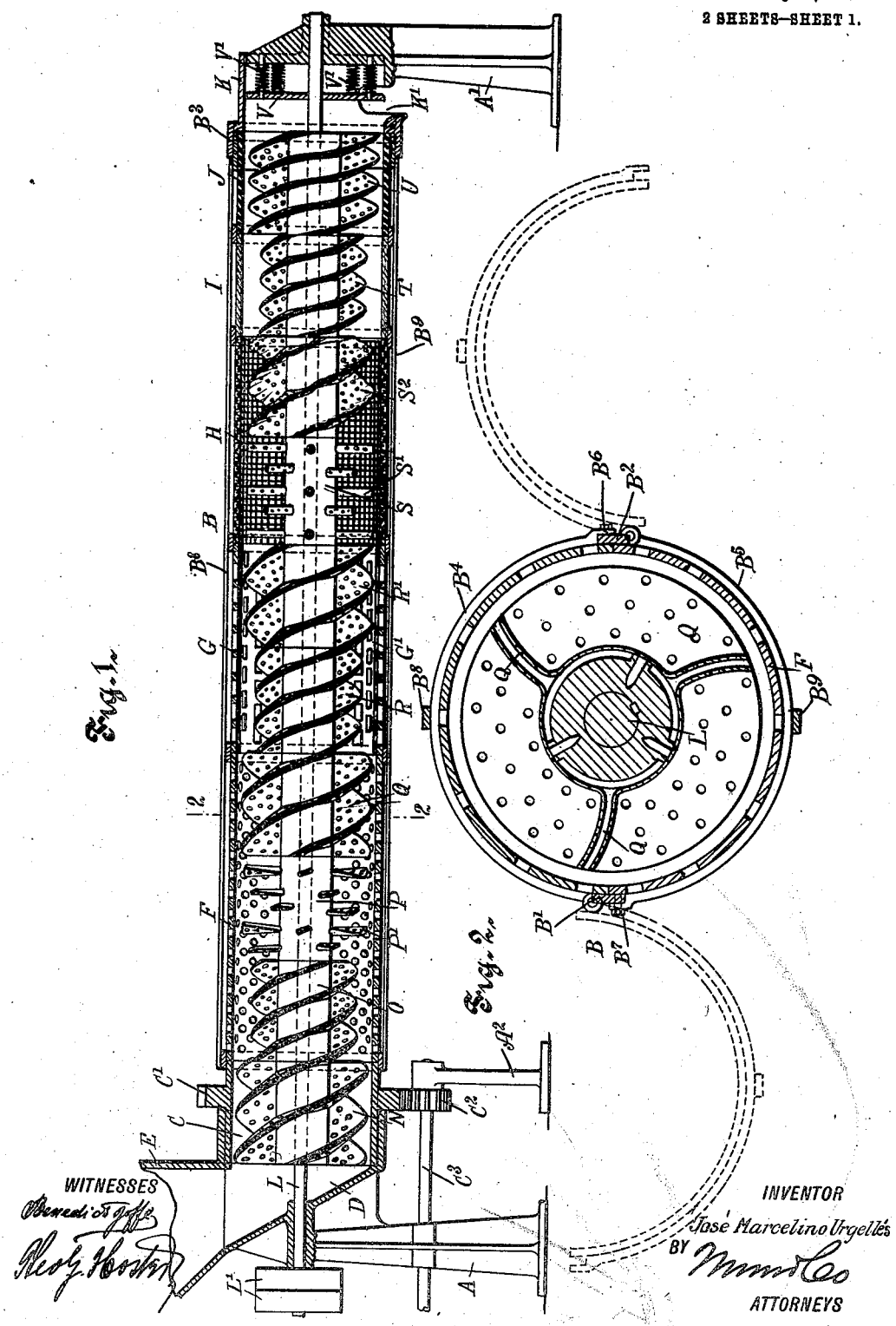

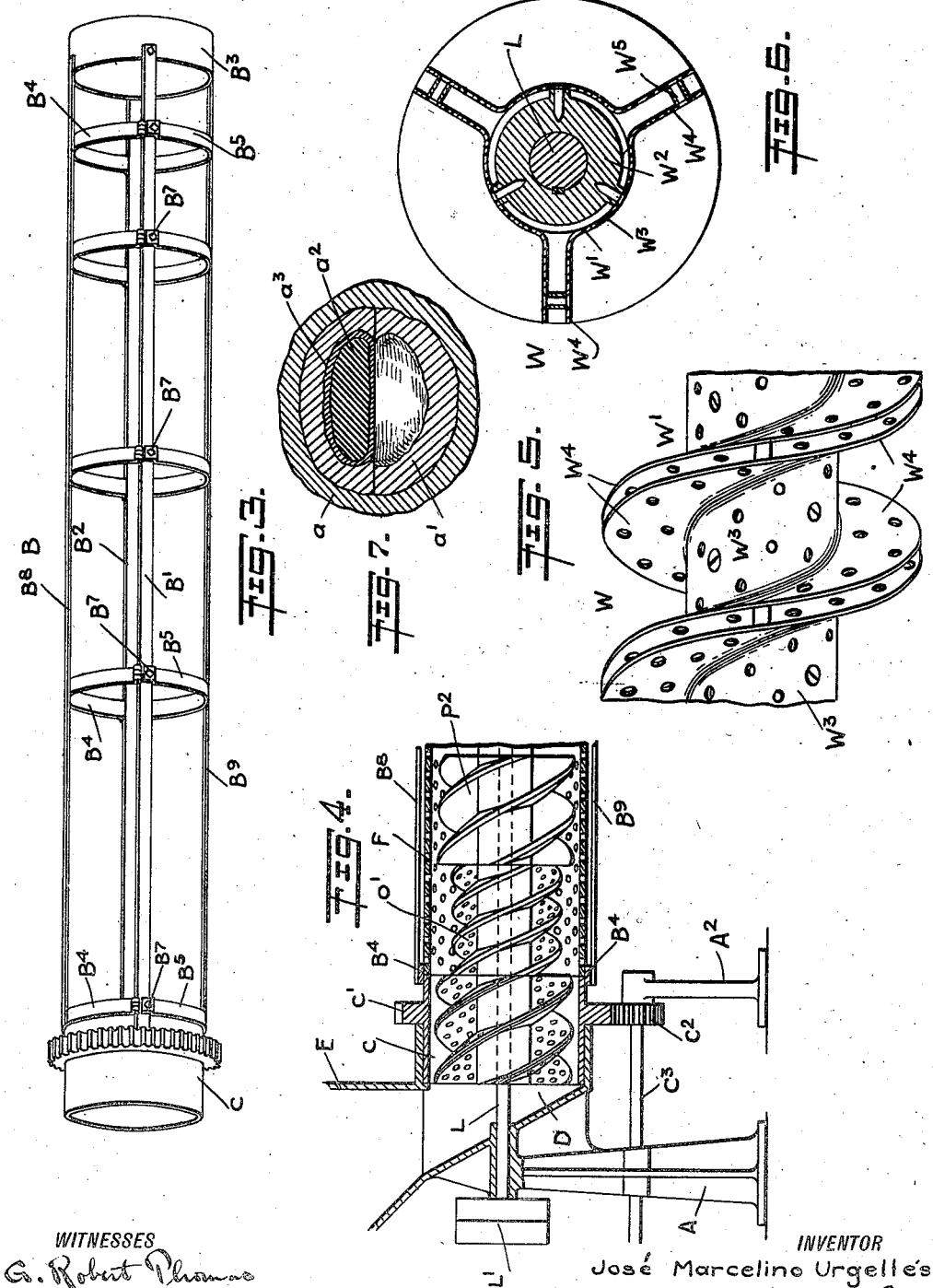

JOSÉ MARCELINO URGELLÉS, OF BARACOA, CUBA.

MACHINE FOR REMOVING PULP FROM COFFEE-BEANS.

1,066,344. Specification of Letters Patent. Patented July 1, 1913.

Application filed May 31, 1912. Serial No. 700,653.

*To all whom it may concern:*

Be it known that I, JOSÉ MARCELINO URGELLÉS, a citizen of the United States, and a resident of Baracoa, in Cuba, West Indies, have invented a new and Improved Machine for Removing Pulp from Coffee-Beans, of which the following is a full, clear, and exact description.

The object of the invention is to provide a new and improved machine for removing pulp from coffee beans in a very simple, effective and economical manner and without injury to the coffee beans.

In order to accomplish the desired result the coffee berries are fed into one end of a cylinder made in sections, the end section being non-perforate and the intermediate sections being perforated, a shaft extending centrally through the cylinder and carrying a series of feeding, agitating and retarding devices, made hollow, and open at their outer ends, the sides of the said devices being provided with openings for the entrance of the pulp into the hollow devices, to be thrown out of the latter by centrifugal force and passed through the perforations of the perforated sections of the cylinder.

A practical embodiment of the invention is represented in the accompanying drawings forming a part of this specification, in which similar characters of reference indicate corresponding parts in all the views.

Figure 1 is a longitudinal central section of the machine for removing the pulp from coffee beans; Fig. 2 is an enlarged cross section of the same on the line 2—2 of Fig. 1; Fig. 3 is a perspective view of the shell of the cylinder; Fig. 4 is a longitudinal central section of a modified form of the machine; Fig. 5 is an enlarged side elevation of a modified form of one of the rotating devices in the cylinder; Fig. 6 is a cross section of the same; and Fig. 7 is an enlarged section of a coffee berry.

Coffee berries as harvested (see Fig. 7) have an outer skin $a$ which incloses a layer of pulp $a'$ surrounding two beans $a^2$ each inclosed in a shell $a^3$. The berry is first treated in a skin remover to remove the outer skin $a$ and to cleave the remaining portion so that practically two berries are had each containing a bean $a^2$ inclosed in a shell $a^3$ and the latter surrounded by a layer of pulp $a'$. The pulp $a'$ is a sweet, mucilaginous substance of a light color, and clings very tenaciously to the shell $a^3$, and the object of the machine presently to be described in detail is to remove this pulp $a'$ in a simple, effective and economical manner.

On suitable standards A and A' is mounted a cylinder B formed of a series of successive cylindrical sections, of which the first or feeding section C is connected with an inlet D connected at its top with a hopper E for receiving the berries from a skin remover. The section C is not perforated, while the next section F is perforated, and the following section G is likewise provided with perforations preferably somewhat larger than the perforations in the section F, and the section G is provided with a lining G' of cement or other similar rough material. The next following section H is made of wire cloth and the following section I is made of fibrous material. The next section J is made of rubber, leather or other flexible material, and this section connects with a discharge section K fixed to the standard A' and provided in its bottom with a discharge spout K' for the discharge of the beans, as hereinafter more fully explained.

The sections F, G, H, I and J are mounted in a skeleton frame, shown in Fig. 3, and consisting of two longitudinally-extending bars B', B² arranged diametrically opposite each other and of which the forward ends are secured to the feeding section C which latter is journaled in the inlet D. The other ends of the side bars B', B² are secured to a ring B³ mounted to turn in the discharge section K. On the bar B' are hinged hoops B⁴, and similar hoops B⁵ are hinged to the bar B², and the free ends of the hoops B⁴ are fastened by screws B⁶ or other fastening means to the opposite bar B², while the free ends of the hoops B⁵ are fastened by screws B⁷ or other fastening means to the bar B'. The hoops B⁴ are connected with each other at their middle by a longitudinally-extending bar B⁸, and a similar bar B⁹ connects the hoops B⁵ with each other. By the arrangement described the portion of the skeleton shell intermediate the feeding section C and the ring B³ is made in halves which can be swung open in opposite directions, as indicated in dotted lines in Fig. 2, on removing the corresponding screws $B^6$ and $B^7$ to permit of obtaining access to the sections F, G, H, I and J, for removal, repairs or other purposes.

Centrally through the cylinder B, constructed in the manner described, extends a shaft L journaled in standards A and A', and provided at one outer end with pulleys L' connected by belt with other machinery for imparting a rotary motion to the shaft L. The cylinder B is preferably rotated, in a reverse direction to the rotation given to the shaft L, and for this purpose the first or feeding section C is provided on the outside with a gear wheel C' in mesh with a pinion $C^2$ secured on a shaft $C^3$ journaled in the standard A and in another standard $A^2$, and this shaft $C^3$ is connected by pulleys and belt with other machinery for imparting a rotary motion to the shaft $C^3$ which by the pinion $C^2$ and the gear wheel C' rotates the cylinder B.

On the shaft L are secured a number of successive devices for feeding the berries gradually forward in the cylinder and for separating the pulp from the beans, as hereinafter more fully explained. On the shaft L within the first or feeding section C is secured a spiral, hollow blade N, open at its peripheral edge and provided in its side walls with perforations, so that the detached portions of the pulp of the berries can pass through the said perforations into the hollow spiral blade to be thrown out of the same at the peripheral opening by centrifugal force. At the same time the berries are fed forward in the section C by the spiral blade N into the next section F. Within the section F are arranged separating and feeding devices O, P and Q, of which the device O is in the form of a spiral, hollow and perforated blade similar to the blade N; and the device P is in the form of radial pins P' arranged in spiral form on the hub of the device, the pins being hollow and open at their outer ends, and provided with apertures in the side walls for the passage of the pulp into the interior of the pins, to be thrown out of the same by centrifugal force. The device Q is similar in construction to the devices N, O and is provided with a spiral, hollow blade having perforations, the peripheral edges of the blade extending close to the inner surface of the cylinder section F, while the blade of the device O is smaller in diameter than the blades of the devices N and Q, so that the berries are somewhat retarded in the section F to insure a severe rubbing of the berries in this section with a view to separate the pulp from the beans and to cause the pulp to pass into the hollow members from which the pulp is thrown out by centrifugal force and forced through the perforations of the section F, while the beans are sufficiently large to prevent their passage through the perforations in the separating and feeding devices as well as through the perforations in the section F.

It is further understood that by the use of the pins P' the berries are tumbled about within the section F and a continuous rubbing of the berries against the inner surface of the cylinder section F takes place, to facilitate the separation of the pulp from the berries and cause the pulp to pass through the perforations in the section F to the outside of the cylinder and drop on the floor or into a suitable receptacle (not shown) held below the cylinder B.

The blade of the device Q feeds the berries forward into the next section G, in which two spiral and hollow blade separating and feeding devices R and R' are arranged, secured on the shaft L and serving to force the berries against the rough lining G' to aid in detaching the pulp from the beans, the pulp passing through the perforations in the blades to the inside thereof to be thrown out at the peripheral open edge by centrifugal force, the same as above explained, in reference to the other separating and feeding devices.

In the section H is arranged a separating, agitating device S having cylindrical hollow pins S' arranged spirally on the hub of the agitator, the pins having perforations in the sides for the passage of the pulp to the inside of the pins thereof to be thrown out of the same by centrifugal force. The pins S' operate in conjunction with the wire cloth of which the section H is formed to aid in the separation of the pulp from the pins, the detached pulp dropping through the wire cloth into the receptacle below the cylinder. In the section H is also arranged separating and conveying devices $S^2$ having hollow spiral and corrugated blades provided with perforations in the sides, it being understood that this device gives a severe rubbing to the berries with a view to remove the remaining particles of pulp still hanging on the pins.

In the section I is arranged a separator and conveyer T, and a similar separator and conveyer U is arranged in the last section J, the said separators and conveyers T and U being provided with hollow spiral blades the same as the other spiral blades referred to, but the separator and conveyer T is somewhat less in diameter than the following separator and conveyer U, the peripheral edge of which is in close proximity to the inner surface of the section K to retard the berries in the cylinder B and to permit the smaller separator and conveyer T to tumble the berries about against the inner surface of the fibrous material, of which the section I is made, so that a complete separation of the pulp from the beans takes place and the beans are brushed in the section J, as the latter is made of a flexible material and the beans are forced against this material by the separator and conveyer U. By the time the beans reach the discharge spout K' of the discharge section K they are free and clear of the pulp, are polished, and are discharged from the spout K into a suitable receptacle arranged below the spout.

Within the section K is arranged an abutment V mounted on springs V' to allow the abutment V to yield forward and backward, the abutment controlling the spout K' so as to prevent a too rapid discharge of the beans.

When the machine is in use the berries are subjected to the successive actions of the separating, agitating, feeding and retarding devices contained in the cylinder B so that the pulp is gradually and effectively removed from the beans and the pulp is discharged through the perforations of the sections F, G, and H, so that very little pulp, if any, is discharged with the beans at the spout K', it being understood that only small particles of pulp which are rubbed off the beans in the sections I and J may pass along with the beans to the place of discharge.

Instead of the separating devices O and P in the section F use may be made of devices O' and P², shown in Fig. 4, the device O' consisting of a spiral blade conveyer having perforations only without being hollow, while the device P² is in the form of a spiral blade conveyer so that the berries are retarded in the first portion of the section F to insure a severe rubbing of the berries against the perforations in the section F and the perforations in the device O' to separate the pulp from the berries.

The spiral hollow blade separators and conveyers may be made in various ways, for instance, as shown in Figs. 5 and 6, the separator and conveyer W is made in sections W' fastened to a hub W² secured to the shaft L, each section W' being bent out of sheet metal or cast with a hub portion W³ and spiral blade portions W⁴ spaced from the opposite blade portions of the next following sections by spacing devices W⁵, the hub sections W³ as well as the blade sections W⁴ being fully perforated, and the hub sections W³ being likewise spaced from the hub W² except at the middle, at which the sections are attached, as will be readily understood by reference to Fig. 6.

By the arrangement described the separated pulp can readily pass into the hollow separators and conveyers to be thrown out of the same at the outer edge by centrifugal force while the machine is running.

Having thus described my invention, I claim as new and desire to secure by Letters Patent:

1. A machine of the class described, comprising a cylinder made in sections, of which the entrance and exit sections are smooth and the intermediate sections are perforated, the said cylinder being made in two hinged sections to permit of opening the cylinder, a shaft extending centrally through the said cylinder, and successive feeding, agitating and separating devices on the said shaft within the said cylinder sections.

2. A machine of the class described, comprising a cylinder provided with perforations, a separating device comprising a plurality of hollow perforate members located within said cylinder, the perforations in one of said members being larger than in another, and means for turning said cylinder and said separating device independently of each other.

3. The combination of a perforate cylinder, means for turning the same, and a revoluble shaft extending through said cylinder and a plurality of hollow perforate members carried by said shaft, the perforations of one of said members being larger than the perforations of another of said members.

4. A machine of the class described, comprising a revoluble cylinder provided at its ends with non-perforate sections and further provided intermediate its ends with perforate sections, and a revoluble separating device mounted within said cylinder.

5. A machine of the class described, comprising a cylinder made in sections, the end sections being smooth and the intermediate sections perforate, a shaft extending axially through said cylinder, and separating members carried by said shaft and revoluble relative to said cylinder.

6. A machine of the class described, comprising a cylinder, a shaft extending centrally through said cylinder, a plurality of agitating and separating devices carried by said shaft and located within said cylinder, and a yielding abutment mounted in the end of said cylinder.

7. A machine of the class described, comprising a revoluble cylinder made in sections, the entrance section and the exit section being smooth and intermediate sections being perforated, a shaft extending centrally through said cylinder, and a plurality of successive feeding, agitating, and separating devices carried by said shaft and corresponding to respective sections of said cylinder.

8. A machine of the class described, comprising a cylinder made in sections, a shaft extending centrally through said cylinder, successive feeding, agitating, and separating devices carried by said shaft and located within said cylinder and corresponding to respective sections thereof, and a yielding abutment located in the exit section of said cylinder.

9. A machine of the class described, comprising a cylinder, a shaft extending centrally through said cylinder, a plurality of successive feeding, agitating, and separating devices carried by said shaft and located within said cylinder, and a spring-pressed abutment located in one end of said cylinder for controlling the discharge of material therefrom.

10. A machine of the class described, comprising a plurality of sections of which the first is smooth, the next perforated, the third perforated and provided with a lining, and the next made of wire cloth, and revoluble feeding, agitating, and separating members located within said cylinder.

11. A machine of the class described, comprising a cylinder and a separating device mounted therein and provided with revoluble hollow spiral blades, the front half of each blade being of smaller diameter than the rear half thereof.

12. A machine of the class described, comprising a cylinder and a revoluble member mounted therein, said revoluble member carrying spiral hollow perforated blades, some of said blades being of greater diameter than others.

In testimony whereof I have signed my name to this specification in the presence of two subscribing witnesses.

JOSÉ MARCELINO URGELLÉS.

Witnesses:
    THEO. G. HOSTER,
    PHILIP D. ROLLHAUS.